Aug. 31, 1948.    C. SAURER    2,448,281
VIBRATION DAMPENER
Filed March 2, 1945
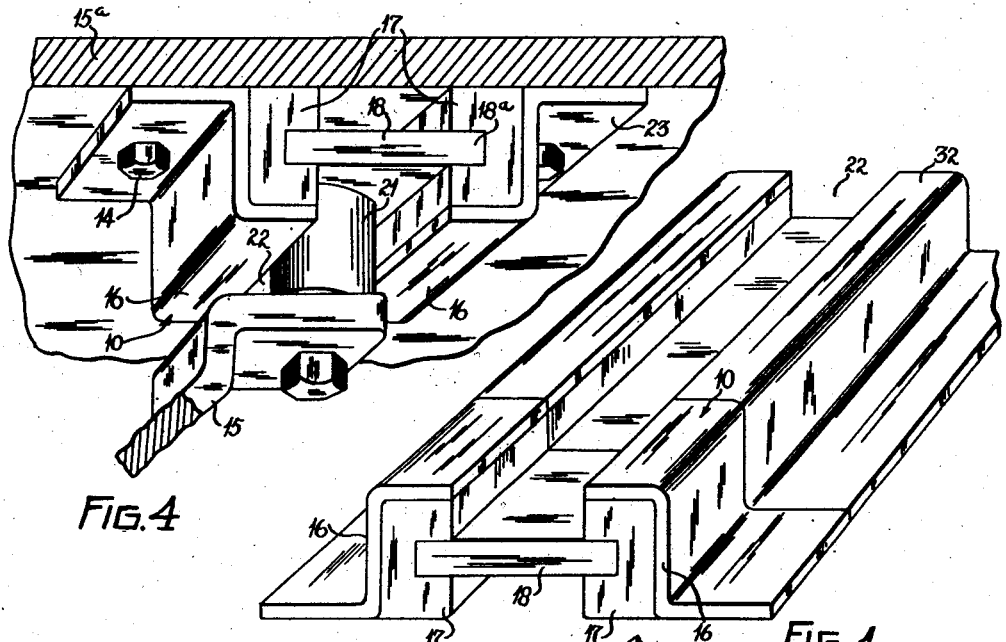
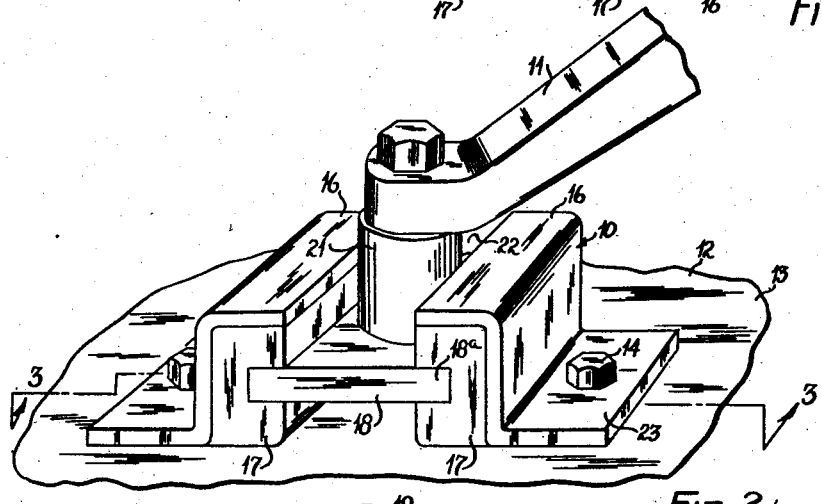
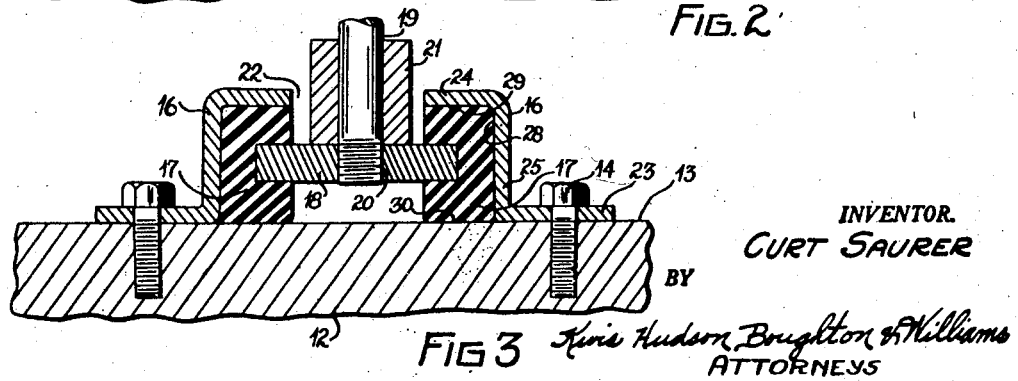
INVENTOR.
CURT SAURER
BY
ATTORNEYS Patented Aug. 31, 1948

2,448,281

UNITED STATES PATENT OFFICE 2,448,281

VIBRATION DAMPENER

Curt Saurer, Cleveland, Ohio, assignor to The Ohio Rubber Company, Willoughby, Ohio, a corporation of Ohio Application March 2, 1945, Serial No. 580,673

4 Claims. (Cl. 248—9)

1

This invention relates to vibration dampeners for mounting machine tools and various other machines and devices, and also for mounting engines such as automobile engines on chassis frames. The invention aims to provide an improved construction for a vibration dampener or mounting of this character which will be simple and inexpensive and will perform its intended function in a more effective and satisfactory manner than previous devices of this kind.

My earlier Patents No. 2,047,493, granted July 14, 1936; No. 2,149,902, granted March 7, 1939; and No. 2,215,743, granted September 24, 1940, disclose vibration dampeners of this general character but the devices of these earlier patents all made use of natural or plantation rubber which retains its resiliency for prolonged periods and acquires very little permanent set. When so-called synthetic rubber is used as the flexible means in a vibration dampener a problem is presented because when synthetic rubber is flexed or distorted repeatedly or for prolonged periods it does not have the ability to return as fully to its initial condition as natural or plantation rubber and in many cases a drift, looseness or permanent set develops which is highly undesirable.

Another object of this invention is to overcome this difficulty and provide an improved vibration dampener in which synthetic rubber can be used as the yieldable medium and which will render satisfactory service comparable with that of dampeners using natural or plantation rubber.

A further object of this invention is to provide an improved construction for a vibration dampener of this character, in which bodies of yieldable material forming the flexible connecting means are so disposed relative to the connected members as to be subjected to tensile, shearing and compressive forces during relative movements between such connected members.

Still another object of the present invention is to provide an improved vibration dampener of the character referred to, in which yieldable rubber-like material is bonded to the members connected thereby with portions of such material extending over, around and under edge portions of the load receiving member so that relative movements of the latter will be resisted by tensile, shearing and compressive forces in the rubber-like material.

The invention can be further briefly summarized as consisting in certain novel combinations and arrangements of parts hereinafter described and particularly set out in the appended claims.

In the accompanying sheet of drawings

Fig. 1 is a perspective view showing a vibration dampener constructed according to the present invention;

Fig. 2 is a perspective view showing the improved vibration dampener embodied in a flexible mounting;

Fig. 3 is a transverse sectional view taken on line 3—3 of Fig. 2; and

Fig. 4 is a perspective view similar to Fig. 2 but showing the vibration dampener embodied in a flexible mounting which is connected with an overhead support.

The vibration dampener of the present invention can be used in flexible mountings for various machines, devices, motors or the like, and serves to dampen or absorb objectionable vibrations and noises. As one example of the uses to which this invention can be put, Fig. 2 shows the improved dampener 10 embodied in a flexible mounting for a machine tool or the like which is here represented by the leg or part 11. The dampener 10 is carried by a floor or support 12 having a substantially flat surface 13 and is preferably anchored to such floor or support by means of screws 14 extending thereinto.

Fig. 4 represents another example of the use to which the vibration dampener 10 can be put and shows this device being used to mount a machine or the like, such as the electric motor 15 (of which only a portion of its casing or supporting structure is here indicated), on the under side of a ceiling or overhead support 15a. When used for such an overhead mounting this improved dampener has the important advantage that even if the rubber-like material fails or weakens as the result of deterioration or other cause, no damage will occur.

The dampener 10 comprises a pair of laterally spaced metal bars 16 having substantially coextending yieldable bodies or blocks 17 of rubber-like material connected therewith, and a load receiving metal body 18 disposed between the bars 16 and having outwardly extending longitudinal edge portions 18a embedded in the yieldable bodies. The metal body 18 may be of any desired form or shape but is here shown as being a substantially flat bar or plate whose outwardly extending longitudinal edges 18a lie in substantially the same plane.

The machine or device being supported may be connected with the load receiving member or plate 18 by means of a bolt or screw 19 engaging in an opening of the latter, such as the threaded opening 20, and extending through a bushing or spacer 21. The spacer 21 is disposed in the space or slot 22 between the bars 16 and is of a length or height such that the leg supported thereon will be located some distance above the tops of the bars 16.

The spaced bars 16 are preferably of a substantially ⌐-shape having outwardly extending longitudinal attaching portions or flanges 23 which rest on the flat surface 13 of the support or floor 12. These bars also have inwardly extending longitudinal flanges 24 which are spaced above the surface 13 and are integrally connected with the attaching flanges 23 by upright longitudinal webs 25. As shown in the drawings, the bars 16 extend in substantially parallel relation to each other with their flanges 24 extending inwardly toward each other and separated by the intervening longitudinal space or slot 22. The load receiving member or plate 18 is substantially wider than the space or slot 22 so that its outer longitudinal edge portions 18a will be in spaced underlying relation to the flanges 24 of the bars 16 and will extend into the yieldable bodies 17.

The bodies or blocks 17 being made of yieldable rubber-like material as mentioned above, form a flexible connection between the bars 16 and the load receiving member 18. The bodies 17 may be of a rectangular cross section, as here shown, having cross-sectional dimensions which are substantially equal to the flange and web portions 24 and 25 of the bars 16. In other words, the bodies 17 have a side face 28 in engagement with the inner face of the web 25 and have top and bottom edge faces 29 and 30 which engage respectively the lower face of the flange 24 and the flat surface 13 of the support 12. When the bodies 17 are constructed and disposed as just described, it will be seen that they substantially fill the longitudinal recesses which are defined by the flange and web portions 24 and 25 of the bars 16.

The load receiving member 18 extends substantially parallel with the flat surface 13 of the support 12 and is located approximately midway between the surface 13 and the flanges 24 with its longitudinal edge portions 18a extending for a substantial distance into the yieldable bodies 17. The rubber-like material constituting the bodies 17 is bonded or vulcanized to the flange and web portions 24 and 25 of the bars 16 and also to the edge portions 18a of the load receiving member 18. When thus bonded to the bars 16 and the member 18, the rubber-like bodies 17 form permanent but yieldable connections between these members with portions of the bodies extending over, around and under the edge portions 18a of the member 18. By having the rubber-like bodies 17 bonded to the flange and web portions of the bars 16 and to the edge portions 18a of the member 18 with the lower edge faces of the bodies 17 resting upon the surface 13 of the support 12 and with portions of the rubber-like bodies extending over, around, and under the edge portions 18a, it will be seen that when relative vibratory movements occur between the load receiving member 18 and the bars 16, the rubber-like material will be subjected to tensile, shearing and compressive forces acting either simultaneously or individually or to various combinations of these forces.

When the movement of the member 18 is downwardly relative to the bars 16, the material in the upper portions of the bodies 17 will be subjected to tension and the material in the lower portions thereof will be subjected to compression. On the other hand, when the relative movement of the member 18 is in an upward direction, the material in the lower portions of the bodies 17 will be subjected to tension while the material in the upper portions of these bodies will be subjected to compression. For both of these relative movements of the member 18, the material located outwardly of and adjacent the edges 18a and adjacent the webs 25 will be subjected to shear or to a combination of shear and tension. Likewise, when relative rocking or tilting of the member 18 takes place, various portions of the bodies 17 will be subjected to tensile, shear and compressive forces or to various combinations of these forces.

The bodies 17 are preferably molded and vulcanized in place against the bars 16 and around the edge portions 18a of the load receiving member 18. This can be accomplished by placing the bars 16 and the member 18 in a suitable mold in which an appropriate stock or compound of rubber-like material is subjected to a molding and vulcanizing operation by which it is cured and bonded to the bars 16 and to the edge portions 18a. The material used for the bodies 17 can be synthetic rubber although, if desired, natural or plantation rubber can be used.

One of the important advantages of the vibration dampener of this invention is that its novel construction minimizes or eliminates the above-mentioned defects or disadvantages of synthetic rubber. The reason for this is that in this improved vibration dampener, the yieldable bodies 17 are connected with and supported by the flange and web portions of the bars 16 for their full length, as well as by the flat surface 13 of the floor or foundation 12, and the load receiving member 18 is also connected with and supported by the bodies 17 for their full length with portions of these bodies extending over, around and under the edges of this member as explained above. The relative movements of the load receiving member 18 are thus resisted by tensile, shearing and compressive forces which are distributed over relatively large amounts of the rubber-like material, such that drift, looseness or permanent set is substantially prevented.

The vibration dampener 10 embodying this invention can be initially constructed so as to have the desired length or, as shown in Fig. 1, a strip-like structure 32 can be fabricated and the dampeners 10 can be obtained by cutting or sawing desired lengths or sections from the structure 32. Appropriate openings for the screws 14 and 19 can be formed in the members 16 and 18 either before or after being connected by the vulcanization of the rubber-like bodies 17 thereto. While the bolt 19 has been illustrated as having screw threads received in a threaded hole in the load receiving member 18, it will be apparent that this mode of connection is not essential. Thus, the bolt 19 may pass freely through the hole in the load receiving member 18 and be provided with a head or separable nut to engage the member 18 on the side opposite to that on which the spacer 21 is placed. It is then unnecessary to thread the hole in the load receiving member 18. Likewise, the spacer 21 may be omitted in installations where the object connected to the vibration dampener has a supporting member which fits freely within the space 22 between the flanges 24.

From the foregoing description and the accompanying drawing it will now be readily understood that the present invention provides a novel construction for a vibration dampener which will render devices of this kind more durable, efficient and satisfactory than heretofore and in which the disadvantage of drift, looseness or permanent set will be substantially eliminated even when synthetic rubber is used as the yieldable connecting medium.

While my improved vibration dampener has been illustrated and described herein in considerable detail, my invention is not to be regarded as correspondingly limited in scope but is intended to include all changes and modifications coming within the spirit of the invention and the scope of the appended claims.

Having thus described my invention, I claim:

1. A vibration dampener comprising a pair of laterally spaced metal bars each including an outwardly extending longitudinal attaching portion and other longitudinal portions extending upwardly and inwardly, laterally spaced yieldable rubber-like bodies substantially coextensive with said bars and having portions thereof continuously in engagement with the upwardly and inwardly extending portions of the bars, and an elongated load receiving metal body disposed between said bars and having substantially flat longitudinal edge portions extending outwardly into said rubber-like bodies and connected therewith, said rubber-like bodies being bonded to said upwardly and inwardly extending portions of said bars and to said edge portions of said load receiving body with portions of the rubber-like bodies extending over, around and under said edge portions so that relative movement of said load receiving body will be resisted by tensile, shearing and compressive forces in the rubber-like bodies.

2. A flexible mounting comprising a pair of laterally spaced metal bars having outwardly extending longitudinal attaching portions adapted to be connected with and rest upon a substantially flat supporting surface, said bars also having longitudinal web portions extending at substantially right angles to said attaching portions and longitudinal flange portions extending inwardly in spaced overhanging relation to said flat supporting surface, a pair of correspondingly spaced yieldable rubber-like bodies connected to and substantially coextensive with said bars, said rubber-like bodies having cross-sectional dimensions substantially equal to said web and flange portions and having their corresponding faces continuously in engagement with said web and flange portions and their lower edges adapted to rest upon said flat surface, and an elongated load receiving metal body disposed between said bars and having substantially flat longitudinal edge portions in spaced underlying relation to said flanges and extending outwardly into said rubber-like bodies and connected therewith, said rubber-like bodies being bonded to said web and flange portions of said bars and to said edge portions of said load receiving body with portions of the rubber-like bodies extending over, around and under said edge portions so that said rubber-like bodies will be subjected to tensile, shearing and compressive forces during movement of said load receiving body relative to said bars and said support.

3. A flexible mounting comprising an elongated metal plate provided with an opening intermediate its ends for receiving a means to connect the plate to an object to be mounted; a rubber-like block for each end of said plate; said blocks each having a substantially rectangular cross-section with portions thereof extending over, around and under the corresponding end of said plate and bonded thereto; a pair of metal bars each having a web portion and oppositely extending flange portions at the ends of said web portion; the web and one of said flange portions of each of said bars being fitted about and bonded to the corresponding two sides of each of said rubber-like blocks; the other of said flange portions of said bars being adapted to be connected to a supporting surface, whereby said rubber-like blocks will be subjected to tensile, shearing and compressive forces during relative movement between said plate and said bars.

4. A flexible mounting comprising a pair of substantially ⌐-shaped metal bars, said bars being laterally spaced with their upper horizontally extending portions directed towards each other, the lower horizontal portions of said bars being adapted to be attached to a substantially flat supporting surface, a pair of yieldable rubber-like blocks each having a substantially rectangular cross-section of substantially the same dimensions as those of the vertical and upper horizontally extending portions of said bars, one of said rubber-like blocks being fitted in and bonded to the said vertical and upper horizontally extending portions of each of said bars, an elongated load receiving metal plate disposed between said bars and having an opening intermediate its ends to receive a means for connecting the plate to the object to be supported, said plate having a length greater than the distance between the upper horizontally extending portions of said bars but less than the distance between the vertically extending portions of said bars, the end portions of said plate extending into and bonded with the said rubber-like blocks with portions of the said rubber-like blocks extending over, around and under the said end portions of said plate so that the rubber-like blocks will be subject to tensile, shearing and compressive forces during relative movement between said load receiving plate and said bars.

CURT SAURER.

REFERENCES CITED

The following references are of record in the file of this patent:

UNITED STATES PATENTS

| Number | Name | Date |
|---|---|---|
| 1,243,358 | Stoddard | Oct. 16, 1917 |
| 1,864,150 | Shields | June 21, 1932 |
| 1,883,893 | Flaherty | Oct. 25, 1932 |